(12) United States Patent
Foucaut et al.

(10) Patent No.: US 10,502,293 B2
(45) Date of Patent: Dec. 10, 2019

(54) ELECTRIC ACTUATOR WITH THREADED ROD

(71) Applicant: Sonceboz SA, Sonceboz (CH)

(72) Inventors: Antoine Foucaut, Montarlot lès Rioz (FR); Benjamin Thierry, Maiche (FR); Julien Ensminger, Klingenthal (FR)

(73) Assignee: Sonceboz SA, Sonceboz (CH)

( * ) Notice: Subject to any disclaimer, the term of this patent is extended or adjusted under 35 U.S.C. 154(b) by 50 days.

(21) Appl. No.: 14/786,627

(22) PCT Filed: Apr. 7, 2014

(86) PCT No.: PCT/EP2014/056909
§ 371 (c)(1),
(2) Date: Oct. 23, 2015

(87) PCT Pub. No.: WO2014/173667
PCT Pub. Date: Oct. 30, 2014

(65) Prior Publication Data
US 2016/0084360 A1    Mar. 24, 2016

(30) Foreign Application Priority Data

Apr. 24, 2013   (FR) ..................................... 13 53733

(51) Int. Cl.
*F16H 25/20*    (2006.01)
*F16H 25/24*    (2006.01)

(52) U.S. Cl.
CPC ............. *F16H 25/20* (2013.01); *F16H 25/24* (2013.01); *F16H 2025/209* (2013.01); *F16H 2025/2028* (2013.01)

(58) Field of Classification Search
CPC .. F16H 25/20; F16H 25/24; F16H 2025/2059; F16H 2025/2028; F16H 2025/2075; F16H 2025/2084; F16H 2025/209; H02K 7/06
See application file for complete search history.

(56) References Cited

U.S. PATENT DOCUMENTS

| 2,683,379 | A | * | 7/1954 | Strandgren | ......... F16H 25/2252 |
| | | | | | 74/424.92 |
| 3,406,584 | A | * | 10/1968 | Roantree | ............. F16H 25/2252 |
| | | | | | 74/424.7 |
| 3,461,736 | A | * | 8/1969 | Curran | .................... F15B 21/08 |
| | | | | | 74/89.31 |

(Continued)

FOREIGN PATENT DOCUMENTS

| EP | 1089019 A1 | 4/2001 |
| EP | 1791242 A1 | 5/2007 |

(Continued)

*Primary Examiner* — Zakaria Elahmadi
(74) *Attorney, Agent, or Firm* — Harness, Dickey & Pierce, PLC

(57) ABSTRACT

An electric actuator includes a threaded rod turned by a motor, the threaded rod having a drive zone extended on each side by threaded zones, one of the threaded zones collaborating with a stationary nut and the other of the threaded zones collaborating with a nut secured to a control member capable of translational movement along an axis parallel to the axis of the threaded zone, the threaded rod being moved with a helical motion.

33 Claims, 4 Drawing Sheets

(56) References Cited

U.S. PATENT DOCUMENTS

| | | | | |
|---|---|---|---|---|
| 4,526,053 A | * | 7/1985 | Carson | F16H 25/2252 74/424.75 |
| 4,648,285 A | * | 3/1987 | Carson | F16H 25/2252 74/424.75 |
| 4,947,070 A | * | 8/1990 | Hill | B64C 13/46 244/223 |
| 4,964,314 A | * | 10/1990 | Wilkes | F16H 25/2252 74/424.92 |
| 5,053,670 A | * | 10/1991 | Kosugi | H02N 2/126 310/323.03 |
| 5,199,764 A | * | 4/1993 | Robinson | B60N 2/0232 297/362.11 |
| 5,992,258 A | * | 11/1999 | Kawase | F16H 25/2252 74/424.75 |
| 6,111,491 A | | 8/2000 | Furuse et al. | |
| 6,752,249 B1 | * | 6/2004 | Jungbecker | F16D 65/18 188/162 |
| 7,223,001 B2 | * | 5/2007 | Pfister | B60Q 1/12 362/469 |
| 7,589,445 B2 | * | 9/2009 | Gandel | H02K 7/06 310/20 |
| 7,682,045 B2 | | 3/2010 | Pfister | |
| 7,963,529 B2 | * | 6/2011 | Oteman | B60G 13/001 188/266 |
| 8,082,818 B2 | * | 12/2011 | Sugitani | F16H 25/2252 74/424.91 |
| 8,581,527 B2 | * | 11/2013 | Seto | F16H 25/2266 310/80 |
| 8,943,920 B2 | * | 2/2015 | Buvril | F16H 25/12 74/424.92 |
| 2003/0178264 A1 | * | 9/2003 | Halasy-Wimmer | F16D 65/18 188/158 |
| 2005/0174796 A1 | * | 8/2005 | Pfister | B60Q 1/076 362/549 |
| 2006/0113933 A1 | * | 6/2006 | Blanding | B64C 13/00 318/116 |
| 2008/0130310 A1 | * | 6/2008 | Pfister | H02K 7/06 362/528 |
| 2009/0079145 A1 | * | 3/2009 | Inoue | B60G 15/063 280/5.515 |
| 2011/0132115 A1 | * | 6/2011 | Lee | H02K 5/161 74/89.37 |
| 2011/0203396 A1 | * | 8/2011 | Hyun | H02K 1/2733 74/116 |
| 2012/0234117 A1 | * | 9/2012 | Oswald | E21B 41/0007 74/89.39 |
| 2013/0152716 A1 | * | 6/2013 | Buvril | F16H 25/2252 74/89.23 |
| 2013/0278098 A1 | * | 10/2013 | Bourqui | H02K 37/14 310/80 |
| 2014/0125172 A1 | * | 5/2014 | Hsieh | H02K 21/145 310/80 |
| 2014/0167539 A1 | * | 6/2014 | Neuhaus | H02K 5/161 310/80 |
| 2014/0326090 A1 | * | 11/2014 | Kisa | B21D 15/04 74/89.23 |
| 2015/0040701 A1 | * | 2/2015 | Shimomura | F16H 25/2219 74/89.23 |
| 2015/0171702 A1 | * | 6/2015 | Matsuda | F16D 23/14 310/68 B |
| 2015/0316130 A1 | * | 11/2015 | Rousseau | F16D 3/68 74/89.23 |
| 2015/0316131 A1 | * | 11/2015 | Rousseau | F16H 25/20 74/89.23 |
| 2015/0323049 A1 | * | 11/2015 | Rousseau | F16H 25/20 74/89.37 |
| 2016/0053912 A1 | * | 2/2016 | Lenz | F16K 31/048 251/129.01 |
| 2016/0164370 A1 | * | 6/2016 | Park | H02K 7/06 310/43 |

FOREIGN PATENT DOCUMENTS

| | | | | |
|---|---|---|---|---|
| SU | | 838201 A1 | 6/1981 | |
| WO | WO-03048599 A1 | | 6/2003 | |
| WO | WO-2013/027197 A2 | | 2/2013 | |
| WO | WO 2013027197 A2 | * | 2/2013 | ............ F16H 25/20 |
| WO | WO-2013027197 A2 | * | 2/2013 | ............ F16H 25/20 |

* cited by examiner

ELECTRIC ACTUATOR WITH THREADED ROD

CROSS-REFERENCE TO RELATED APPLICATIONS

This application is a National Phase Entry of International Application No. PCT/EP2014/056909, filed on Apr. 7, 2014, which claims priority to French Patent Application Serial No. 1353733, filed on Apr. 24, 2013, both of which are incorporated by reference herein.

FIELD OF THE INVENTION

The present invention relates to the field of linear electric actuators intended for moving a drive member, over a limited travel and secondarily to the angular movement of a member, by means of a conversion of the linear movement into a rotary movement. These linear electric actuators are generally used in the automobile field for controlling fluid valves useful to the engine or to move elements improving the comfort of the driver. (Regulation of inlet air flow, flow of fluid in adjustable suspensions; mobility of front headlights or head-up display systems on the windscreen, etc.)

BACKGROUND

The general principle of such actuators is known and described for example in the international patent application WO 2010/027701. This patent application describes an actuator with a screw comprising two threaded parts with opposite threads engaged by motors turning in opposite directions in order to move the screw in translation with a greater force than with a system comprising only one motor. The opposite threads cancel out the resulting torque exerted on the screw by the two motors.

Another patent application WO 2013/027197 describes an electric linear actuator comprising an electric motor with a rotor and a stator, a housing and a nut-and-screw system for moving a member to be moved at least in translation in a direction A corresponding to the rotation axis of the rotor, the nut-and-screw system comprising a screw with a first threaded portion and a first nut with a complementary thread engaging with the first threaded portion, the first nut being coupled so as to rotate with the rotor. The screw comprises a second threaded portion and the nut-and-screw system comprises a second nut engaging with the second threaded portion, the second threaded portion and the second nut being configured so as to apply a reduction factor in the linear movement of the screw (with respect to linear movement due to the first threaded portion and to the first nut alone), the first and second threaded portions having opposite threads with respect to each other. In one embodiment, the first threaded portion is adjacent to the second threaded portion.

The European patent EP 1561639 describes an actuator intended for adjusting the horizontal or vertical position of car headlights that are of high performance even under extreme environmental conditions, in particular for temperature ranges from −40° C. to +120° C., and being resistant to dust, water and salt. The European patent EP 1791242 describes an actuator for the linear movement of a member to be controlled, comprising a housing, a motor and a nut-and-screw system. The motor, which is preferably a stepping motor, comprises a stator comprising coils and a rotor comprising permanent magnets, the rotor being supported, at one of its ends, by a bearing in the form of a ball bearing, comprising a race fixed to the housing and an output race secured to the rotor. The international patent application WO 03048599 describes a screw actuator comprising a nut element interacting with two separate coaxial screw threads and two screws that each have a different thread corresponding to the screw threads of the nut element.

In many applications, the actuators must comply with the working conditions of the automobile field, which imposes very wide temperature ranges, normally from −40° C. to +140° C., without significant loss of performance. The electric linear actuators of the prior art are, in the great majority of cases, constructed from a rotary motor coupled to a movement transformation in order in the end to give rise to a translation. The simplest solution is in fact using a rotor mounted so as to rotate on bearings or roller bearings, the said rotor driving a nut and screw system that generates the translation of the control member.

This solution has numerous advantages with regard to compactness and reliability in severe environments but it turns out that the performances of these actuators drop significantly as soon as they are used at very low temperature (between −20° C. and −40° C.), because of the variation in viscosity of the greases used in the ball bearings and bearing housings. This problem is complicated to solve since it is possible to find greases that remain fluid and lubricate correctly between +20° C. and +140° C. or other types that remain so from −40° C. to +25° C., but the only greases that make it possible to fulfil the function of lubrication (resistance to pressure without rupture of the film) without great variation in viscosity (which creates a brake on the bearing) over the whole of the range −40° C. to +140° C. are limited to rare compositions based on silicone. However, this silicone element is proscribed in the majority of automobile applications because of its effect of degassing and pollution of the peripheral elements.

The result is a real problem in offering automobile linear actuators working at −40° C. to +140° C., and offering the required lubrication for ensuring the service life of the product, without drops in performance when cold, due to the great viscosity of the grease that brakes the bearing significantly. At the present time the majority of linear actuators of the prior art are based on the combination of a rotary motor and a nut and screw system. These lose more than half their force when passing from 25° C. to −40° C. This leads to oversizing the motor in order to compensate for this loss and to achieve the specification expected by the user.

SUMMARY

The proposed solution according the invention consists of simplifying the structure of these linear actuators by eliminating the elements for the rotational guidance of the rotor such as ball bearings or plain bearings and directly guiding the rotor assembly by means of a connection of the helical type, which very substantially increases the performance at low temperature. To this end, the invention concerns, according to its most general acceptance, an electric actuator comprising a threaded rod actuated rotationally by a motorised means, characterised in the said threaded rod has a drive zone extended on each side by threaded zones, one of said threaded zones cooperating with a fixed nut, and the other one of said threaded zones cooperating with a nut secured to a control member able to move in translation along an axis parallel to the axis of said threaded zone, said threaded rod being moved in a helical movement.

According to a first variant, said motorised means consist of a stator interacting electromagnetically with a rotor provided with a permanent magnet, mechanically connected to said drive zone. Advantageously, said magnet is moulded onto the threaded shaft driving the control member.

According to a second variant, said motorised means is formed by a worm driving a gear forming said drive zone. Advantageously, the control member is in sliding connection with a flange, which has various angular positions allowing manual adjustment of the linear position of the control member independently of its movement controlled by the electric motor.

BRIEF DESCRIPTION OF THE DRAWINGS

The present invention will be better understood from a reading of the following description, referring to the accompanying drawings corresponding to non-limitative example embodiments, where.

DETAILED DESCRIPTION

Figure 1:
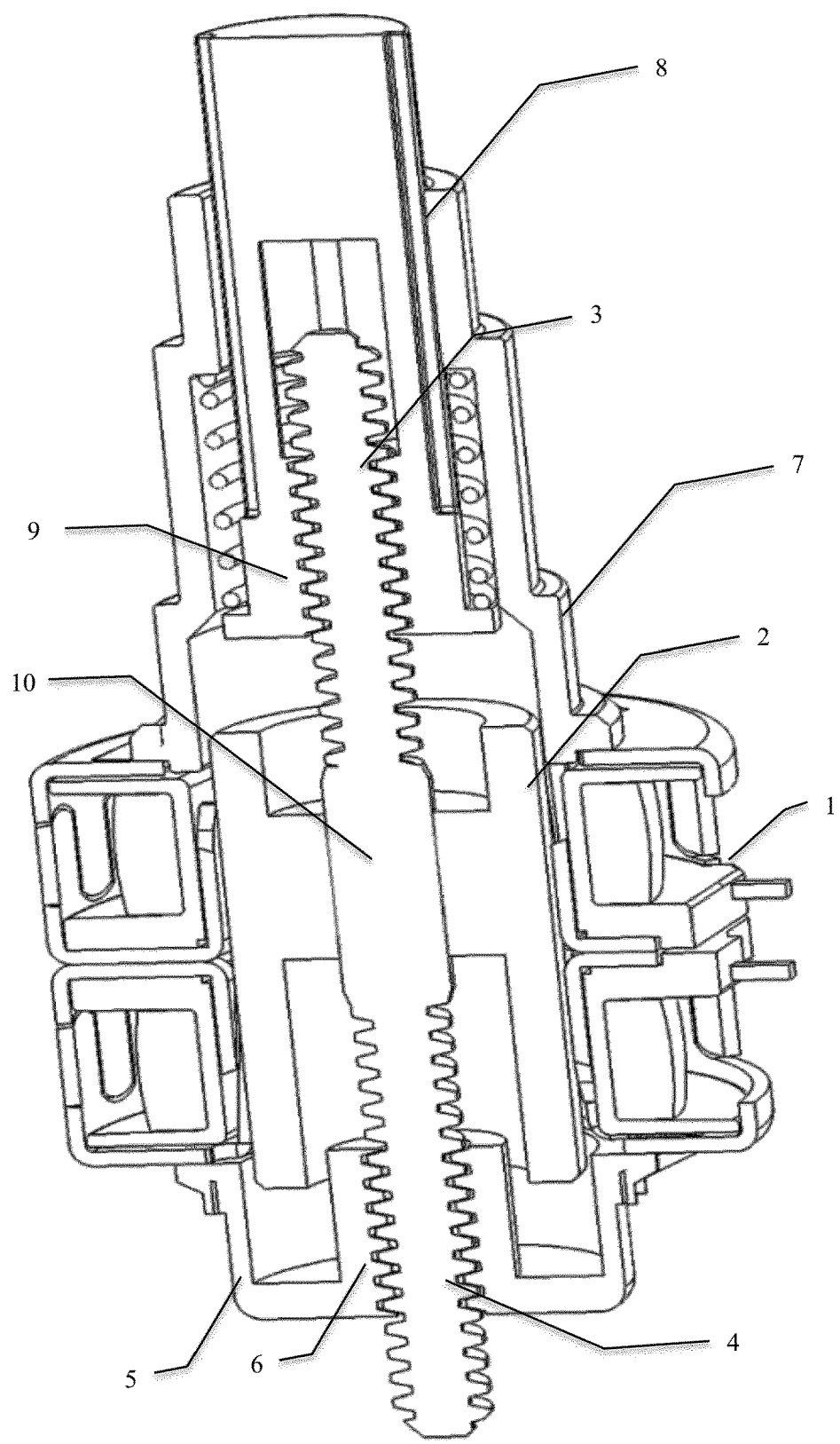
FIG. 1 depicts a view in longitudinal section of a first example embodiment.

The invention is described in the non-limitative examples according to four embodiments, making it possible to use the simple linear actuator as described above or in combination with an upstream or downstream movement transformation for offering respectively more reduction or a rotary actuator consisting of a linear actuator according to the invention coupled to a rotary lever. The electric actuator according to the solution corresponding to a first example embodiment illustrated by FIG. 1 comprises:

a multiphase stator 1
a rotor comprising a multiple magnet 2
a shaft having two distinct threaded parts 3, 4
a first flange 5 fixed with respect to the stator 1 and carrying a first fixed nut 6 connected to said stator 1
a second flange 7 fixed with respect to the stator 1
a control member 8 comprising a second nut 9, able to move in translation without rotation in the second flange 7 by means of a sliding connection.

The electromagnetic assembly formed by the stator 1 and the rotary rotor 2 drives the central part 10 of the threaded shaft in a helical movement imposed by the rotation of the rotor 2 for the rotary component, and the connection between the first threaded part 4 of the rotor assembly with the first fixed nut 6 for the translation component. The helical movement of the threaded shaft drives the control member 8 in a pure translation through the connection between the second threaded part 3 of the threaded rod with the second nut 9 secured to the control member 8.

This solution has various advantages: The first advantage is eliminating any type of pivot connection at the threaded central shaft in comparison with the existing systems. The elimination of these ball bearings or rotary bearings avoids the loss of torque related to the increase in viscosity of the grease.

The efficiency of the transformation of a rotary movement into a linear movement is identical to that of the traditional solution of screw coupled to a single nut. The gain in torque at the guides (the previous point) is therefore completely preserved in terms of power available at the output on the linear control member. In the case where the two threaded portions of the central shaft have opposite directions and the same pitch, the movement of the output member is twice that of the rotor assembly, which makes it possible to increase the speed of movement of the output member at equal frequency at the stator. This constitutes an advantage when the pitch of the screw can no longer be increased for reasons of difficulty in manufacture. The construction of the actuator is greatly simplified and the number of components greatly reduced, which has an advantage with regard to reducing the costs of the components but also the costs of the assembly machine as well as the product assembly time.

On the dimensional level, the central shaft comprises two threaded parts 3, 4 and collaborates with two nuts 6, 9 to generate the forward travel of the output member 8. Because of this its length occupied for the movement transformation function is a little greater than that of a traditional simple screw driven by a rotary nut. However, in reality, this is compensated for (for the most usual travels required in cars of around 10 mm) by the elimination of the rotor guides. The overall size of the linear actuator is therefore equivalent for small travels, which are used in applications of metering air or mobility of headlights.

Finally, the mass is greatly reduced by the elimination of the ball bearing necessary for absorbing the axial force in the solutions of the prior art, and the solution has its full advantage with the use of a plastic nut that carries the central shaft. The metal parts are therefore reduced to a minimum, only at the magnetic sheets of the stator, and at the central shaft that has good tribology to function with the plastic nuts. The linear actuator corresponding to this first embodiment comprises a two-phase stator that drives a rotor assembly consisting of a multiple magnet fixed coaxially on the central zone 10 of the shaft having a first rear threaded part, in engagement with a first nut connected to a rear flange clamped to the stator, and a second threaded part in engagement with an output member comprising a second nut. A front flange fixed to the stator has a sliding connection enabling the output member to follow a translation imposed by the helical movement of the rotor assembly.

The needle at the end of the control member moves over a travel of 10 mm, which is broken down into a relative movement of 5 mm with respect to the rotor assembly to which there is added the 5 mmm of movement of the rotor assembly with respect to the fixed nut connected to the rear flange. For this purpose the length of the magnet is extended by 5 mm with respect to the length of the stator, which makes it possible to preserve the torque applied by the stator to the rotor despite the axial movement of the latter. Likewise the control member has a recess in line with the second nut so as to allow the central shaft to penetrate by 5 mm in order to make its relative travel.

The rotor assembly is guided solely by the two crossed helical connections, the sliding connection between the output member and the front flange completing the guidance as far as a fixed reference. When the rotor makes one turn, it advances by a value equivalent to the pitch of the fixed nut, whereas the control member advances by a value equal to the sum of the pitches of the fixed and movable nuts. When the two threaded parts have opposite directions but the same pitch, the apparent pitch of the control member corresponds to twice the screw pitch. This type of design is advantageous for actuators requiring great compactness and greatly reduced mass. It is then possible to offer an actuator at low cost, the low-temperature performances of which are obtained from a low-cost magnet such as ferrites, since the torque is not reduced by a high level of parasitic friction upstream of the movement reduction, as is the case with the solutions of the prior art.

Figure 2:
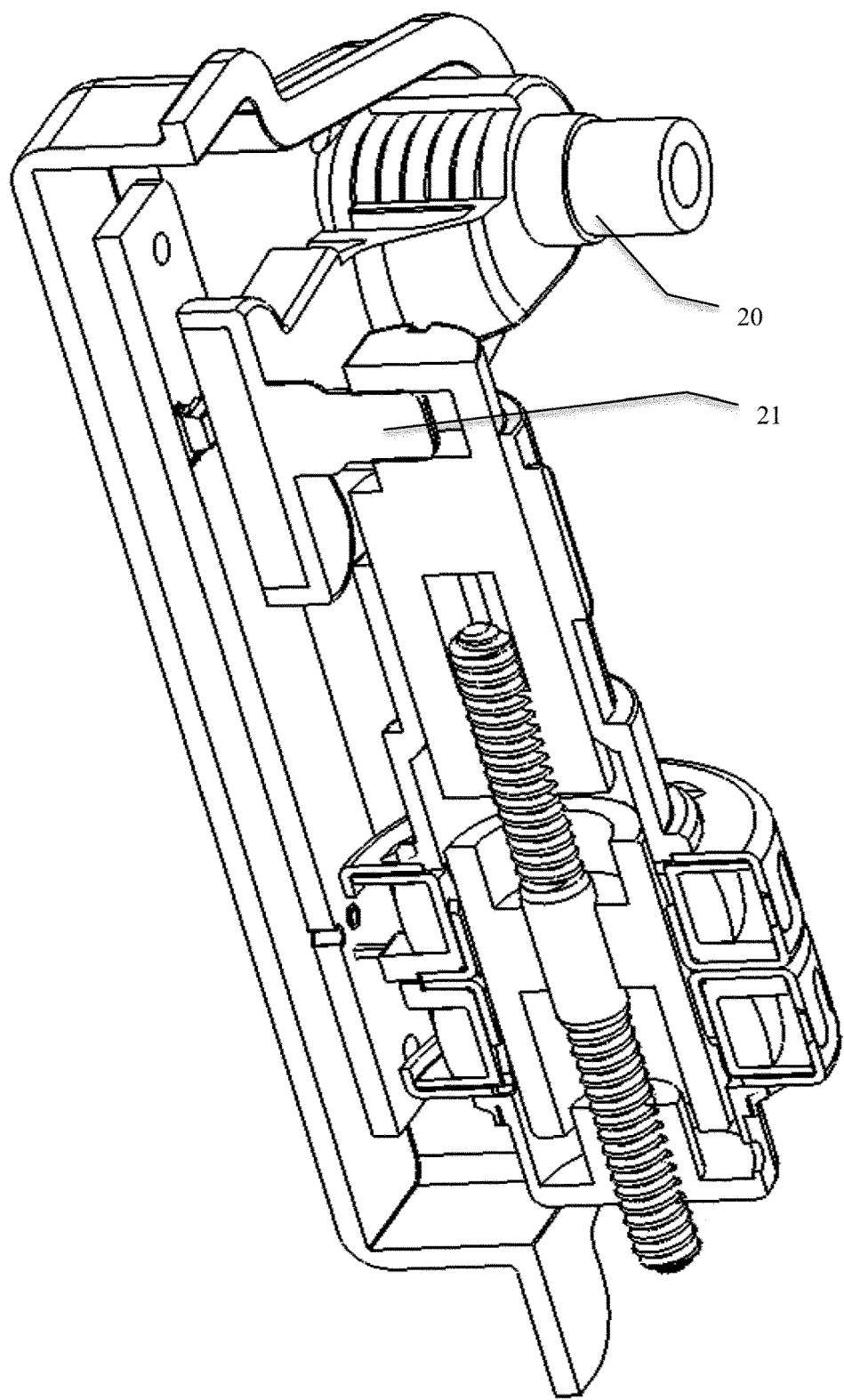
FIG. 2 depicts a view in longitudinal section of a second example embodiment.

In the second embodiment illustrated by FIG. 2, a linear actuator as described previously is associated with a rotary lever 20 in order to form a rotary actuator. The linear rotary movement transformation is achieved by a rotor assembly travelling through a helical movement and benefiting from limited guidance at the screw/nut connections. This first stage makes it possible to have high movement reduction in a limited space, and in addition the metal screw that absorbs the axial force has great rigidity, which makes it possible to achieve great precision of positioning of the carriage. This carriage then transmits its movement to a rotary lever 21 that describes a limited angle but offers high torque as well as great precision of positioning, and this with a simple and inexpensive solution. Finally, this actuator has relatively stable performances at low temperature in comparison with existing solutions based on guidance by rotor or screw by ball bearings that brake when cold, or pressure guides with a conical shape on a ball via a spring, which do not make it possible to achieve the required service life in cars because of the metal/metal friction that ends up by creating wear.

Figure 3:
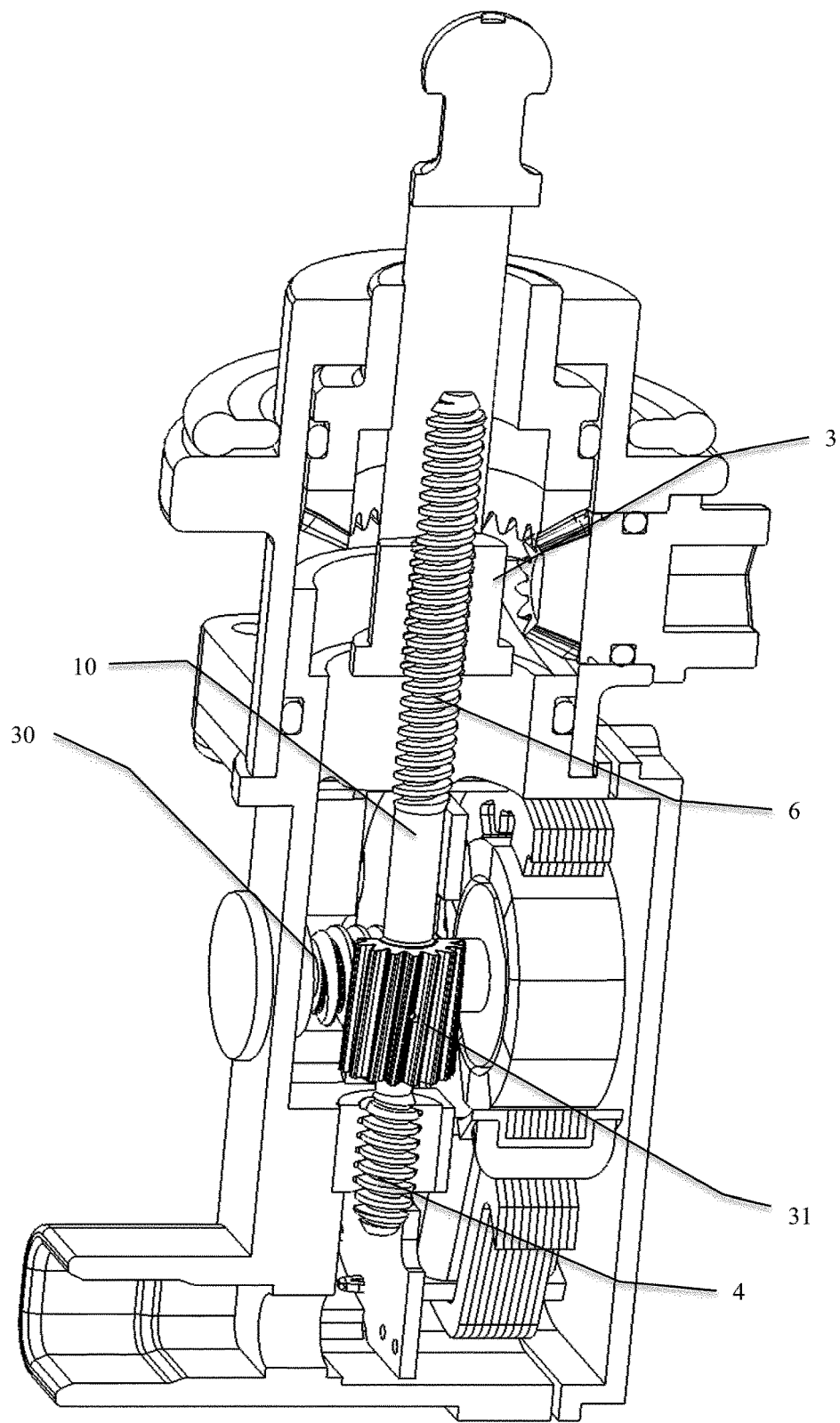
FIG. 3 depicts a view in longitudinal section of a third example embodiment.

The third embodiment described with reference to FIG. 3 relates to a linear actuator that is distinguished from the previous two example embodiments through the use of a gearbox between the electric driving motor and the helical singular movement transformation claimed in this document. The multiphase motor drives a rotor, on which a worm 30 is embedded, which drives a gear 31, mounted fixedly and coaxial in the central zone 10 of the shaft having two distinct threaded parts 4, 6. When the driving rotor rotates the gear 31 through the worm 30, a first nut fixed with respect to the housing enables the assembly formed by the shaft and the gear 30 to follow a helical movement, which then drives the output member by means of the second helical connection of the second nut situated at the rear of the output member. The sliding connection of the output member, in a front flange the rotation of which is blocked by the adjustment hub, provides pure translation of this output member.

The adjustment hub has a conical set of teeth that makes it possible to modify the angular position of the front flange. This rotation of the front flange imposes the rotation of the output member that is screwed onto the threaded part before the central axis, when the motor is stopped and the worm is blocking the rotation of the central shaft. This solution makes it possible to achieve a linear preliminary position of the output member that is independent of the so-called electrical travel, which will be determined by the rotation of the motor. This actuator thus has a mechanical manual preliminary adjustment travel in parallel with the electrical travel imposed by the motor control. This type of solution is used in particular in actuators for adjusting the height of the front headlights of a vehicle, which are adjusted manually in the factory at the time of the final assembly of the vehicle, and for which the motors afford automatic adjustment in height of the lights with the load of the vehicle or its acceleration, in order to prevent dazzling other drivers.

Figure 4:
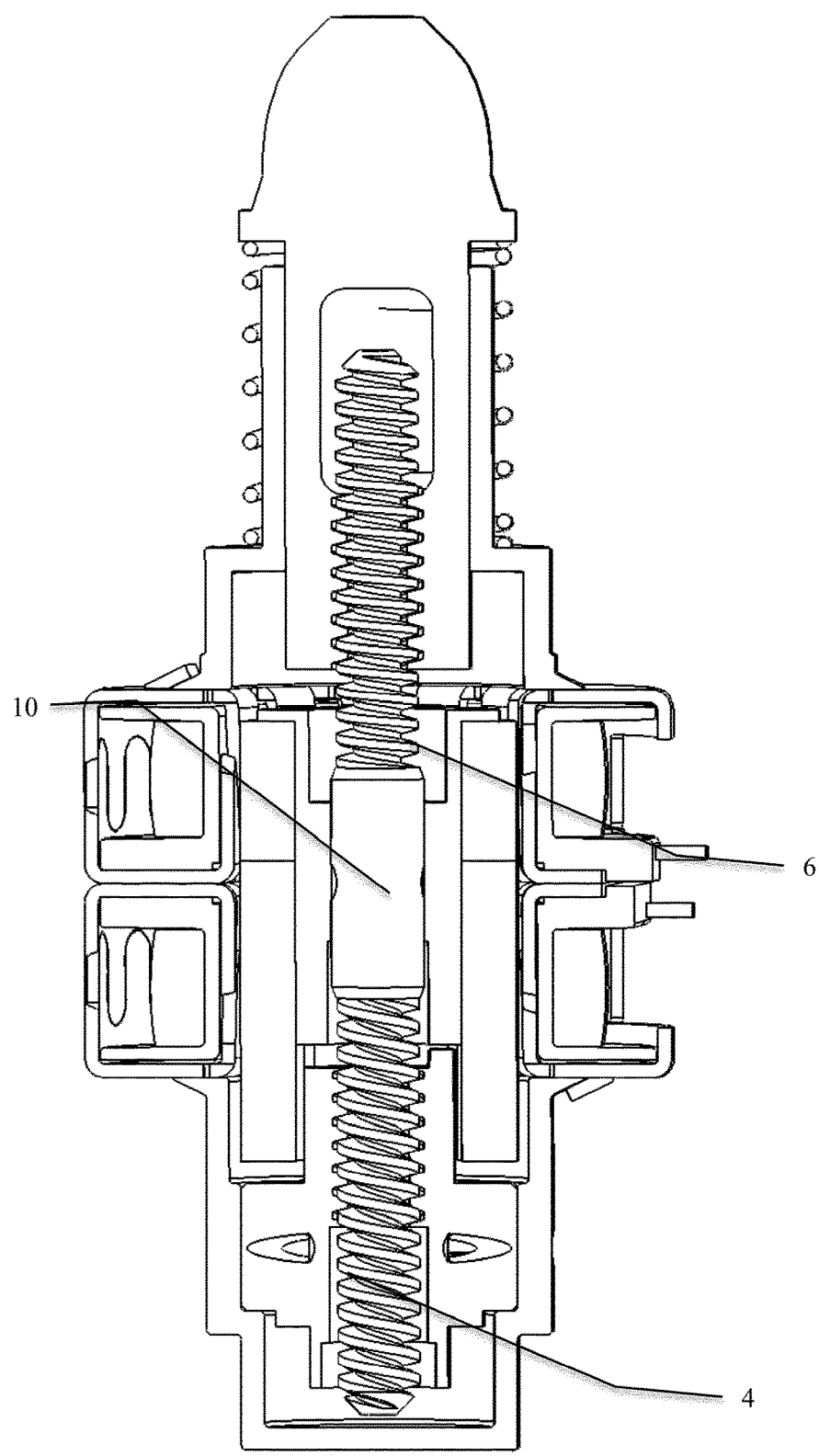
FIG. 4 depicts a view in longitudinal section of a fourth example embodiment.

FIG. 4 illustrates an embodiment similar to the first embodiment since it is based on the association of a simple rotor assembly consisting of a magnet moulded onto a central shaft having two threaded parts, one of them collaborating with a fixed nut connected to the stator, the second threaded part collaborating with an output member comprising a nut and able to translate in a front flange through a sliding connection. However, in this embodiment, the helix angles are in the same direction, and only the pitches of the two threaded parts are different. The helical movement of the rotor, imposed by the connection with the fixed nut, thus causes, depending on the relative values of the two screw pitches, an outward or return movement of the output member, but with a force ratio that may be stepped down.

This is because, if the first threaded part has a pitch p1 and the second threaded part a pitch p2, the movement of the output member for one turn of the rotor will be p2−p1. This therefore gives rise to the possibility, by working with similar pitch values, to greatly reduce the movement and therefore to amplify the output force of the control member compared with embodiment No. 1. In addition, in this case, it is possible to work with relatively high helix angles (only the difference in pitches defines the force ratio) but the helix angles thus increased substantially increase the efficiency of the transformation from rotation to translation and achieve optimisation of the motor size. It is a case of combining the solution according to embodiment No. 1 with the concept of the screw with differential threads, so as to enable an actuator with high thrust at low temperature for low travels, such as the apportioning of fluid in thermostatic valves.

The present invention covers various designs of linear actuator involving a shaft having two threaded parts and where the helical movement creates the translation of an output member. These designs are characterised by the fact that:

The control member is in sliding connection with the housing of the actuator.

The movable assembly that causes the linear movement of the control member is guided solely through two helical connections.

For the first two embodiments described by way of non-limitative examples, the motor magnet is driven in helical movement. The magnet is moulded on to the threaded part driving the control member.

For the third embodiment described, the central threaded shaft in a helical movement is driven by a gearbox of the worm and gear type. The control member is in sliding connection with a flange, which has various angular positions allowing manual adjustment of the linear position of the control member independently of its movement controlled by the electric motor.

The invention claimed is:

1. An electric actuator, comprising:
   a threaded rod actuated in rotation by a motor;
   said threaded rod having a drive zone, which is driven by a rotor of said motor and which is extended on each side by threaded zones;
   one of said threaded zones cooperating with a fixed nut;
   another one of said threaded zones cooperating with a nut integral with a control member adapted to move along a first axis parallel to a second axis of said threaded zone; and
   said threaded rod being moveable in a helical movement;
   wherein said motor includes a stator interacting electromagnetically with said rotor provided with a permanent magnet, mechanically connected to said drive zone; and
   wherein said magnet is moulded onto said threaded rod driving said control member.

2. An electric actuator comprising:
   a threaded rod actuated in rotation by a motor;
   said threaded rod having a drive zone, which is driven by a rotor of said motor and which is extended on each side by threaded zones;

one of said threaded zones cooperating with a fixed nut;

another one of said threaded zones cooperating with a nut integral with a control member adapted to move along a first axis parallel to a second axis of said threaded zone; and said threaded rod being moveable in a helical movement;

wherein said control member is in sliding connection with a flange, which has various angular positions allowing manual adjustment of linear position of said control member independently of its movement controlled by said motor.

3. An electric actuator according to claim 2, wherein said motor includes a stator interacting electromagnetically with said rotor provided with a permanent magnet, mechanically connected to said drive zone.

4. An electric actuator according to claim 2, wherein said magnet is moulded onto said threaded rod driving said control member.

5. An electric actuator according to claim 1, wherein said motor includes a worm driving a gear forming said drive zone.

6. An electric actuator according to claim 1, further comprising pitches of said threaded zones are different.

7. An electric actuator according to claim 6, wherein said motor includes ferrite magnets.

8. An electric actuator according to claim 1, wherein said motor and said threaded rod act as an automobile headlight adjustor.

9. An electric actuator according to claim 1, wherein said motor and said threaded rod act as an automobile fluid valve actuator.

10. An electric actuator according to claim 1, wherein said motor and said threaded rod act as an automobile inlet air flow regulator.

11. An electric actuator, comprising:
a motor;
a threaded rod rotatable by said motor;
a fixed first nut connected to a stator by a flange;
said threaded rod including multiple spaced apart threaded zones, one of said threaded zones cooperating with said fixed first nut;
a second nut;
an elongated control member;
another one of said threaded zones enmeshing with said second nut, which is integral with said control member, with both of said second nut and said control member being adapted to move along a first axis parallel to a second rotational axis of said threaded zones when said rod is rotated;
a flange, said control member being in sliding connection with said flange, which has various angular positions allowing manual adjustment of linear position of said control member independently of its movement controlled by said motor; and
helical movement of said threaded rod translating said control member through a connected between said threaded zones and said second nut secured to said control member, without bearings.

12. An electric actuator according to claim 11, wherein said motor includes ferrite magnets.

13. An electric actuator according to claim 11, wherein said motor and said rod act as an automobile headlight adjustor.

14. An electric actuator according to claim 11, wherein said motor and said rod act as an automobile fluid valve actuator.

15. An electric actuator according to claim 11, wherein said motor and said threaded rod act as an automobile inlet air flow regulator.

16. An electric actuator according to claim 11, wherein:
said motor includes a stator interacting electromagnetically with a rotor provided with a permanent magnet, mechanically connected to said drive zone; and
said magnet is molded onto said threaded rod driving said control member.

17. An electric actuator according to claim 11, further comprising a worm gear enmeshing a rotational output of said motor to a gear attached to said threaded rod between said zones.

18. An electric actuator, comprising:
a motor;
a threaded rod rotatable by said motor;
a fixed first nut;
said threaded rod including multiple spaced apart threads;
a first of said threads enmeshing with said fixed first nut;
a second nut;
a second of said threads enmeshing with said second nut, with said second nut operably moving along a first axis parallel to a rotational axis of said threads when said rod is rotated;
a central gear located on said rod between said spaced apart threads; and
a worm gear rotatable by said motor about a rotor axis substantially perpendicular to said rotational axis of said threads, said worm gear enmeshing with and operably rotating said central gear.

19. An electric actuator according to claim 18, further comprising:
a housing enclosing said motor, said fixed first nut and said central gear of said rod;
a flange secured to said housing; and
a control member being in sliding connection with said flange, which has various angular positions allowing manual adjustment of linear position of said control member independently of its movement controlled by said motor.

20. An electric actuator according to claim 18, wherein:
said motor and said rod act as an automobile headlight adjustor; and
said gear is located closer to a trailing one of said threads than to a leading one of said threads which is coupled to a control member, which in turn is coupled to said adjustor.

21. An electric actuator according to claim 18, wherein:
said motor and said rod act as an automobile fluid valve actuator; and
said gear is located closer to a trailing one of said threads than to a leading one of said threads which is coupled to a control member, which in turn is coupled to said valve actuator.

22. An electric actuator according to claim 18, wherein:
said motor and said threaded rod act as an automobile inlet air flow regulator; and
said gear is located closer to a trailing one of said threads than to a leading one of said threads which is coupled to a control member, which in turn is coupled to said regulator.

23. An electric actuator according to claim 18, wherein:
said motor includes a stator interacting electromagnetically with a rotor which includes a permanent magnet;
said motor is a multiphase motor; and
said electric actuator is a linear actuator.

24. An electric actuator according to claim 18, further comprising an adjustment hub including a conical set of teeth that operably allow an angular position modification to provide a mechanical and manual adjustment.

25. An electric actuator, comprising:
a motor including a multiphase stator and a rotor having magnets;
an elongated and metallic rod rotatable by said motor about a rotating axis;
a fixed plastic nut having an internal thread;
said threaded rod including multiple spaced apart and helically threaded zones with different thread characteristics, a first of said threaded zones enmeshing with said fixed nut;
a moveable plastic nut having an internal thread;
a second of said threaded zones enmeshing with said moveable nut, with said moveable nut being adapted to linearly move when said rod is rotated;
said moveable nut including a sliding connection to deter rotation of said moveable nut but allow said linear movement thereof;
said moveable nut being elongated along a direction of said rotating axis; and
a rotary lever moveably coupled to said moveable nut adjacent a distal end of said moveable nut.

26. An electric actuator according to claim 25, wherein said different thread characteristics are thread pitches.

27. An electric actuator according to claim 25, wherein said different thread characteristics are thread helical directions.

28. An electric actuator according to claim 25, wherein said motor and said rod act as an automobile headlight adjustor, and said actuator does not have greased bearings.

29. An electric actuator according to claim 25, wherein said motor and said rod act as an automobile fluid valve actuator, and said actuator does not have greased bearings.

30. An electric actuator according to claim 25, wherein said motor and said threaded rod act as an automobile inlet air flow regulator, and said actuator does not have greased bearings.

31. An electric actuator according to claim 25, wherein said rotating axis of said rod is coaxial with a rotational centerline of said rotor.

32. An electric actuator according to claim 25, further comprising a worm gear driven by said motor enmeshing with a central gear attached to said threaded rod between said threaded zones, said rotating axis of said rod being substantially perpendicular to a rotational centerline of said rotor and said worm gear.

33. An electric actuator, comprising:
a motor;
a threaded rod rotatable by said motor;
a fixed first nut connected to a stator;
said threaded rod including multiple spaced apart threaded zones, one of said threaded zones cooperating with said fixed first nut;
a second nut;
an elongated control member;
another one of said threaded zones enmeshing with said second nut, which is integral with said control member, with both of said second nut and said control member being adapted to move along a first axis parallel to a second rotational axis of said threaded zones when said rod is rotated;
a flange, said control member being in sliding connection with said flange; and
helical movement of said threaded rod translating said control member through a connected between said threaded zones and said second nut secured to said control member, without bearings.

* * * * *